US012673849B2

(12) United States Patent
Tan et al.

(10) Patent No.: US 12,673,849 B2
(45) Date of Patent: Jul. 7, 2026

(54) MULTI-PURPOSE ADJUSTABLE HANGING BEAM AND HANGING METHOD

(71) Applicants: CHINA THREE GORGES CORPORATION, Wuhan (CN); CHINA THREE GORGES CONSTRUCTION ENGINEERING CORPORATION, Chengdu (CN)

(72) Inventors: Zhiguo Tan, Wuhan (CN); Peng Gao, Beijing (CN); Feixiong Yao, Beijing (CN); Xinyue Zhu, Yichang (CN); Tianran Yang, Wuhan (CN)

(73) Assignees: CHINA THREE GORGES CORPORATION (CN); CHINA THREE GORGES CONSTRUCTIONENGINEERING CORPORATION (CN)

( * ) Notice: Subject to any disclaimer, the term of this patent is extended or adjusted under 35 U.S.C. 154(b) by 73 days.

(21) Appl. No.: 18/027,562

(22) PCT Filed: Jul. 21, 2022

(86) PCT No.: PCT/CN2022/107091
§ 371 (c)(1),
(2) Date: Mar. 21, 2023

(87) PCT Pub. No.: WO2023/035786
PCT Pub. Date: Mar. 16, 2023

(65) Prior Publication Data

US 2024/0025704 A1 Jan. 25, 2024

(30) Foreign Application Priority Data

Apr. 14, 2022 (CN) ......................... 202210390804.1

(51) Int. Cl.
*B66C 1/22* (2006.01)
*B66C 13/08* (2006.01)

(52) U.S. Cl.
CPC .............. *B66C 1/22* (2013.01); *B66C 13/085* (2013.01)

(58) Field of Classification Search
CPC B66C 1/10; B66C 1/22; B66C 13/085; B66C 23/00
See application file for complete search history.

(56) References Cited

U.S. PATENT DOCUMENTS 4,010,971 A * 3/1977 Kuwamoto ............... B66C 1/48 294/81.5
2022/0340395 A1* 10/2022 Maedo ...................... B66C 1/10

FOREIGN PATENT DOCUMENTS

CN 101134551 A 3/2008
CN 204111171 U 1/2015
(Continued)

OTHER PUBLICATIONS

International Search Report of PCT/CN2022/107091.
Written Opinion of PCT/CN2022/107091.

*Primary Examiner* — Sang K Kim

(57) ABSTRACT

The present disclosure provides a novel multi-purpose adjustable hanging beam and a hanging method. The novel multi-purpose adjustable hanging beam includes two parallel main beams, two ends of each main beam are respectively connected with end beams, a plurality of displacement hangers sliding relative to the main beams are arranged on the main beams, screw rods are arranged between the two main beams, the displacement hangers are in threaded connection with the screw rods, a first motor is arranged at one end of each screw rod, reduction gearboxes are arranged between the first motors and the screw rods, one end of each screw rod is connected with the corresponding reduction
(Continued)

gearbox, and the first motors and the reduction gearboxes are mounted on the end beams.

15 Claims, 16 Drawing Sheets

(56) References Cited

FOREIGN PATENT DOCUMENTS

| | | | |
|---|---|---|---|
| CN | 113830663 | A | 12/2021 |
| JP | 5468270 | B2 | 4/2014 |

* cited by examiner

MULTI-PURPOSE ADJUSTABLE HANGING BEAM AND HANGING METHOD

CROSS-REFERENCE TO RELATED APPLICATIONS

This Application is a national stage application of PCT/CN2022/107091. This application claims priorities from PCT Application No. PCT/CN2022/107091, filed Jul. 21, 2022, and from the Chinese patent application 202210390804.1 filed Apr. 14, 2022, the content of which are incorporated herein in the entirety by reference.

TECHNICAL FIELD

The present disclosure relates to the field of hanging, in particular to a novel multi-purpose adjustable hanging beam and a hanging method.

BACKGROUND

Lifting equipment often adopts a hanging method of lifting a hanging beam in multi-machine lifting and hanging or under complex hanging conditions. The hanging beam is a special hanging appliance for loading and unloading heavy cargoes and components. When heavy objects are hoisted, it is necessary to accurately find the gravity center positions of the heavy objects and accurately distribute the load of each hanging point to ensure the safe and reliable operation of the hanging beam. The existing hanging beam takes a form of fixation of upper and lower hanging points. Thus, the structure is simple. The hanging beam structurally includes a large balance beam, and a small balance beam, a hanging appliance and the like that are nested in the large balance beam. The hanging beam hangs the heavy objects through a sling, so as to realize the transportation, loading and unloading of the heavy objects. However, due to the unreasonable structural arrangement and poor balance performance, when the heavy objects are hung, it is necessary to accurately find the gravity center positions of the heavy objects and accurately distribute the load of each hanging point, otherwise, it is easy to make the deflection of the hanging beam too large, resulting in potential safety hazards; and meanwhile, the hanging beam has a relatively single function, so that the use range and functions of the prior art are limited, and the universality is poor. The requirements of the lifting equipment on adjustable lifting and hanging weight and amplitude and the requirements of the lifting equipment on extreme amplitude extension may not be met. The hanging beam of which the upper and lower hanging points may not be adjusted may not meet the requirements of multiple occasions and functions. For this reason, a novel multi-purpose adjustable hanging beam and a hanging method are provided to solve the problems.

The Chinese patent document CN208266824U describes a balance pulley device for adjusting the deviation of a hanging point. The balance pulley device includes a pulley block and is characterized by further comprising a first hanging plate, a second hanging plate, a transverse hanging beam, a bolt connection pair, and a supporting hinge component mounted on a rack, the first hanging plate and the second hanging plate are both fixed on the lower surface of the transverse hanging beam, the supporting hinge component includes a supporting hinge fixing seat and a supporting hinge shaft, the lower part of the supporting hinge fixing seat is fixed on the rack through the bolt connection pair, the upper part of the supporting hinge fixing seat is rotationally connected with the transverse hanging beam through the supporting hinge shaft, the pulley block comprises a first balance pulley and a second balance pulley, the first balance pulley is mounted at one end of the transverse hanging beam through the first hanging plate, and the second balance pulley is mounted at the other end of the transverse hanging beam through the second hanging plate. According to the utility model, the balance of the two hanging points may be adjusted dynamically in real time during the operation of a hoist without stopping for maintenance so that the operation stability of the hoist may be effectively guaranteed. However, this structure may not meet the requirements of the lifting equipment on adjustable lifting and hanging weight and amplitude and the requirements of the lifting equipment on extreme amplitude extension. The hanging beam of which the upper and lower hanging points may not be adjusted may not meet the requirements of multiple occasions and functions. There are defects in use. Thus, an improvement is required.

SUMMARY

The present disclosure provides a novel multi-purpose adjustable hanging beam and a hanging method, which solve the problem that the requirements of lifting equipment on adjustable lifting and hanging weight and amplitude and the requirements of the lifting equipment on extreme amplitude extension may not be met. The hanging beam of which the upper and lower hanging points may not be adjusted may not meet the requirements of multiple occasions and functions.

In order to solve the technical problems, the present disclosure adopts the technical solution that a novel multi-purpose adjustable hanging beam includes two parallel main beams, two ends of each main beam are respectively connected with end beams, a plurality of displacement hangers sliding relative to the main beams are arranged on the main beams, screw rods are arranged between the two main beams, the displacement hangers are in threaded connection with the screw rods, a first motor is arranged at one end of each screw rod, reduction gearboxes are arranged between the first motors and the screw rods, one end of each screw rod is connected with the corresponding reduction gearbox, and the first motors and the reduction gearboxes are mounted on the end beams.

In the preferred solution, bearing holes are formed on the inner side of each main beam, each main beam is provided with a beam track, a power supply control cabinet is arranged on a cantilevered platform of one of the main beams, and is provided with a solar panel, and a storage battery is arranged on one side of the power supply control cabinet.

In the preferred solution, the displacement hangers include hanger main bodies, through slots are formed in the hanger main bodies, at least one suction solenoid valve is arranged in each through slot, ends of the suction solenoid valves are connected with silk tiles, the other ends of the suction solenoid valves are mounted on the hanger main bodies, and the silk tiles are in threaded connection with the screw rods.

In the preferred solution, return springs are arranged between the silk tiles and the hanger main bodies, upper hanging lugs are arranged at the tops of the hanger main bodies, and lower hanging lugs are arranged at the bottoms of the hanger main bodies.

In the preferred solution, telescopic positioning pins are arranged on two sides of each hanger main body, pin penetrating motors are arranged on the hanger main bodies, a pin penetrating oil pump is arranged at one end of each pin penetrating motor, and the pin penetrating oil pumps are connected with the positioning pins through telescopic oil cylinders; and when the positioning pins on the two sides of each hanger main body extend out, the positioning pins abut against the bearing holes.

In the preferred solution, a plurality of side plates are arranged on two sides of each hanger main body, road wheels hinged to the side plates are arranged on the side plates, and slide against beam tracks, and a position sensor and a weight sensor are arranged on each hanger main body.

In the preferred solution, at least one screw rod is provided between the two main beams, a bearing seat is arranged between the two main beams, and is located at the centers or eccentric positions of the main beams, a bearing is arranged on the bearing seat, and the screw rods are rotationally connected with the bearing seat.

A hanging method of a novel multi-purpose adjustable hanging beam, comprises the following steps: when a single first crane is used:

S1, placing a hanging hook of the first crane in place in the air, and connecting the first crane with two of the displacement hangers on a hanging beam device;

S2, hanging a counterweight box or at least one heavy object at the bottoms of at least two of the displacement hangers on the hanging beam device, and adding a calculated appropriate amount of balancing weights into a balancing weight grid body of the counterweight box through matching calculation or automatic calculation of a program;

S3, when the first crane is used for hoisting, controlling the power supply control cabinet manually or automatically through a system according to a program, so that the displacement hangers hung with the heavy objects and the counterweight boxes move on the main beams in an equal moment, and the posture of the hanging beam device is adjusted in the air to keep dynamic balance;

S4, hanging the heavy objects to a target position by the first crane, unhooking after the heavy objects are in place, controlling the power supply control cabinet at any time manually or through a system according to a program during the process, and adjusting the posture of the hanging beam device to keep dynamic balance;

S5, repeating step S4 until the heavy objects are completely unloaded; and S6, after dropping from the hanging hook of the first crane, unloading the counterweight boxes, thereby finishing the hanging.

In the preferred solution, S1, placing the hanging hook of the crane in place in the air, and connecting one or more cranes with a plurality of displacement hangers (3) on a hanging beam device;

S2, hanging a counterweight box and one or more heavy objects at the bottoms of a plurality of displacement hangers on the hanging beam device, and adding a calculated appropriate amount of balancing weights into a balancing weight grid body of the counterweight box through matching calculation or automatic calculation of a program;

S3, when the crane is used for hoisting, controlling the power supply control cabinet manually or automatically through a system according to a program, so that the displacement hangers hung with the hanging hook of the crane, the counterweight box or the heavy object move on the main beams in a moment matching manner, so as to dynamically adjust the relative positions of the hanging hoist of the crane, the counterweight box or the heavy object on the hanging beam in the air to keep dynamic balance;

S4, hanging one hung heavy object to a target position by the crane, unhooking after the heavy object is in place, controlling the power supply control cabinet manually or through a system according to a program during the process, and adjusting the posture of the hanging beam device to keep dynamic balance;

S5, repeating steps S3 and S4, and then hanging another heavy object to the target position and unhooking until the heavy objects are completely unloaded; and S6, after dropping from the hanging hook of the crane, unloading the counterweight boxes, thereby finishing the hanging.

In the preferred solution, S1, placing the hanging hooks of one or more cranes in place in the air, and connecting the cranes with upper hanging lugs of the displacement hangers;

S2, connecting the two ends of a hung object with lower hanging lugs of the two of the displacement hangers through steel wire ropes, and mounting a remote control electric hoist on a hanging rope for connecting one end of the hung object and the lower hanging lugs of the displacement hanger;

S3, controlling the power supply control cabinet manually or automatically through a system according to a program, so that the displacement hanger hung with the heavy object move on the main beams, the gravity center of the heavy object is kept on a vertical line position calculated and set by the hanging beam device to keep dynamic balance, and meanwhile, remotely controlling the electric hoist to extend or retract the steel wire rope in a wireless mode until the steel wire rope of the electric hoist is in an unstressed state and the heavy object is in a vertical state, thereby finishing turning over; and S4, after the first crane and the second crane are rotated to a hook dropping position, unloading the heavy object, thereby finishing the hanging.

The present disclosure has the beneficial effects that the two ends of the two main beams are connected with the two end beams to form an integrally stable structure; the main beams and the end beams are used in combination; a light and stable structure such as a box girder or an I-beam may be used; and preferably, two parallel box girders are used as the main beams, and the two ends of the main beams are connected by a box end beam to form an integrally stable structure.

A plurality of displacement hangers may be dynamically adjusted on the main beams, and may realize that a plurality of heavy objects or counterweight boxes with different weights may be hung below the hanging beam device. The hanging beam device may drive the displacement hangers to slide on the main beams on the basis of ensuring dynamic balance by acquiring information such as the position of the displacement hanger hung with the hanging hook of the crane, as well as the position of the displacement hanger hung with the heavy object or the counterweight box, and the hanging weight at any time through the automatic operation of a system control program, a moment arm of the heavy object or the counterweight box is adjusted, so that a moment balance is formed between the hung heavy objects or between the heavy objects and the counterweight box, so as to meet the requirements of dynamic luffing multi-machine lifting and hanging on various occasions, single-machine or multi-machine amplitude extension hanging, hanging in a hole on a shallow wall, single-machine aerial turning, matching or full-load hanging by using a plurality of cranes to adjust hanging points, simultaneous hoisting and unloading at different times of a plurality of hung objects, aerial dynamic adjustment of the hanging points of the cranes and the like which are difficult to be met by a hanging point fixing hanging beam.

The device can well meet the requirement of dynamic adjustment of the hanging point of the crane, and when the upper hanging point of the crane is adjusted, the displacement hanger, the heavy object at the lower part and the counterweight box synchronously move to keep overall dynamic balance, thereby avoiding the safety problem caused by the balance loss of the hanging beam device if the lower hanging point is not synchronously adjusted. Meanwhile, the hanging beam device has the advantages of simple structure, strong universality, automatic adjustment and the like.

According to the hanging mode of outward extension, the hoisting amplitude range of the crane is extended, the hanging of the shallow hole on the side wall which is difficult to realize by the original lifting equipment can be realized in the same way, and thus, a simple, convenient, easy and safe idea and device are provided for solving the engineering problems.

At present, two ends of a heavy object hung by two cranes are usually used to cooperate to perform luffing and hanging hook lifting, so that the turning-over process of the heavy object from a horizontal state to a vertical state in the air is finished. The patent can well meet the requirement of turning over in the air only by a single crane, the two displacement hangers of the hanging beam device are respectively hung with the two ends of the heavy object in the horizontal state, the lower hanging point of one of the displacement hangers is firstly connected with the remote control electric hoist and then connected with one end of the heavy object through a hanging rope, and an electric control system drives the displacement hanger to move in the mutual approaching direction automatically or manually through the synchronous operation of a parameter setting program, so that the conversion of the heavy object from the horizontal state to the vertical state is gradually realized, the overall dynamic balance is kept, and the safety problem caused by balance loss when the heavy object needs to be turned over in the air. Meanwhile, when the heavy object need to be turned over in the air, two or more than two hoisting equipment are needed to cooperate to turn over the heavy object in the prior art, and only one lifting equipment is needed by the device and the method, so that the working time of workers is greatly shortened, the on-site construction steps are optimized, the economic benefit is improved, the probability of occurrence of safety accidents is reduced, and the device and the method have great popularization value.

BRIEF DESCRIPTION OF THE DRAWINGS

The present disclosure will be further described below with reference to the accompanying drawings and examples.

Figure 1:
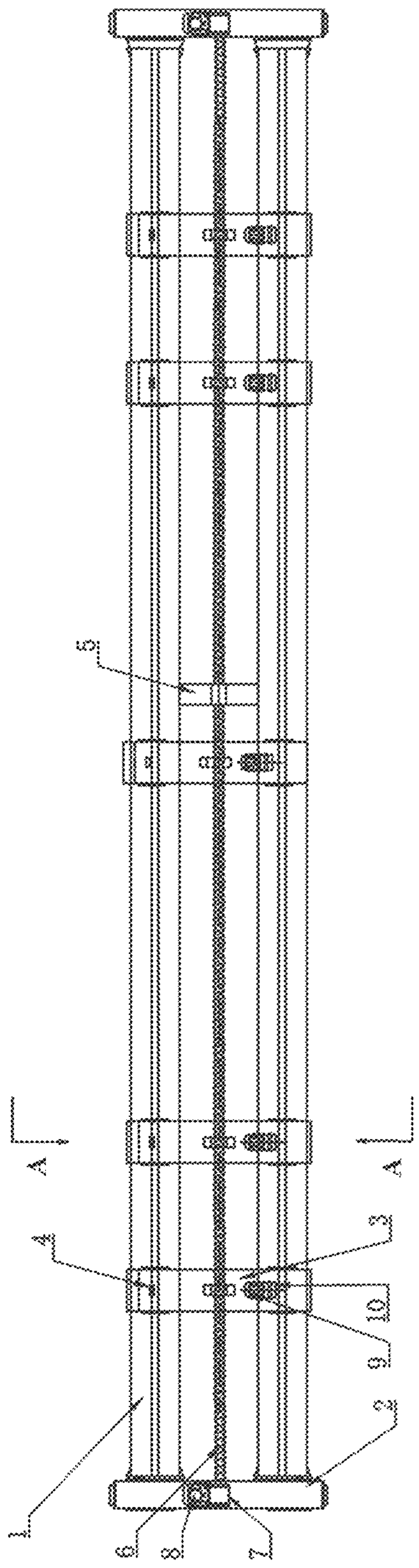
FIG. 1 is a plan view of an overall structure according to the present disclosure.

Reference numerals: main beam 1; bearing hole 101; beam track 102; end beam 2; displacement hanger 3; hanger body 301; return spring 302; suction solenoid valve 303; positioning pin 304; road wheel 305; upper hanging lug 306; lower hanging lug 307; silk tile 308; through slot 309; side plate 310; position sensor 4; bearing seat 5; screw rod 6; first motor 7; reduction gearbox 8; pin penetrating motor 9; pin penetrating oil pump 10; storage battery 11; power supply control cabinet 12; solar panel 13; weight sensor 14; first crane 15; second crane 16; electric hoist 17; counterweight box 18; balancing weight grid body 1801; balancing weight 1802.

DETAILED DESCRIPTION OF THE EMBODIMENTS

Example 1

Figure 2:
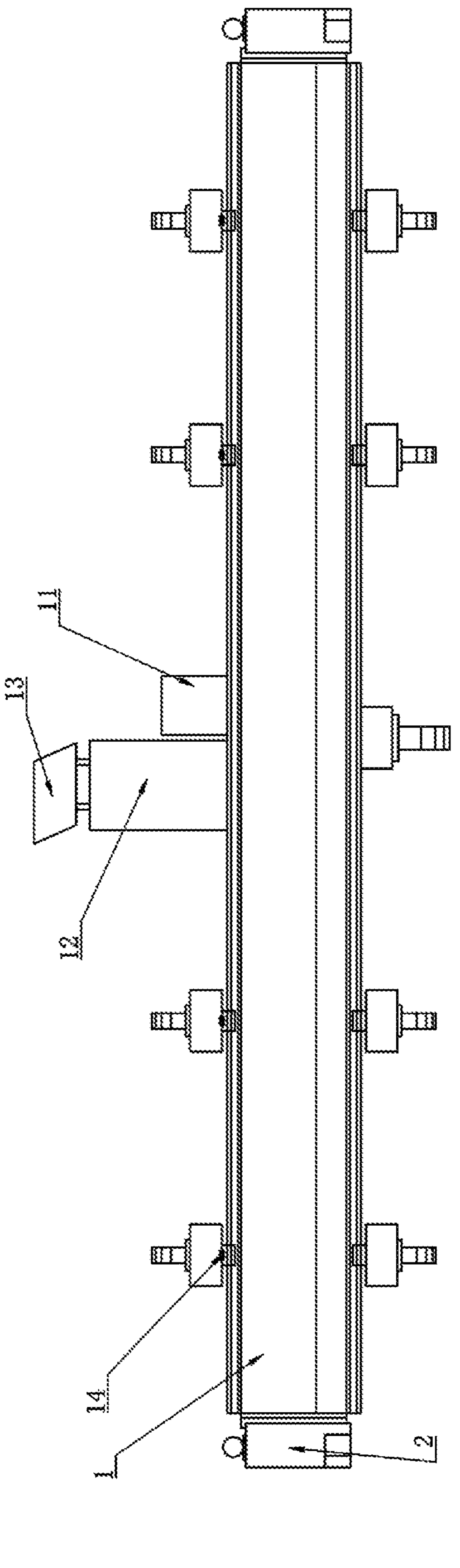
FIG. 2 is a side view of an overall structure according to the present disclosure.
Figure 3:
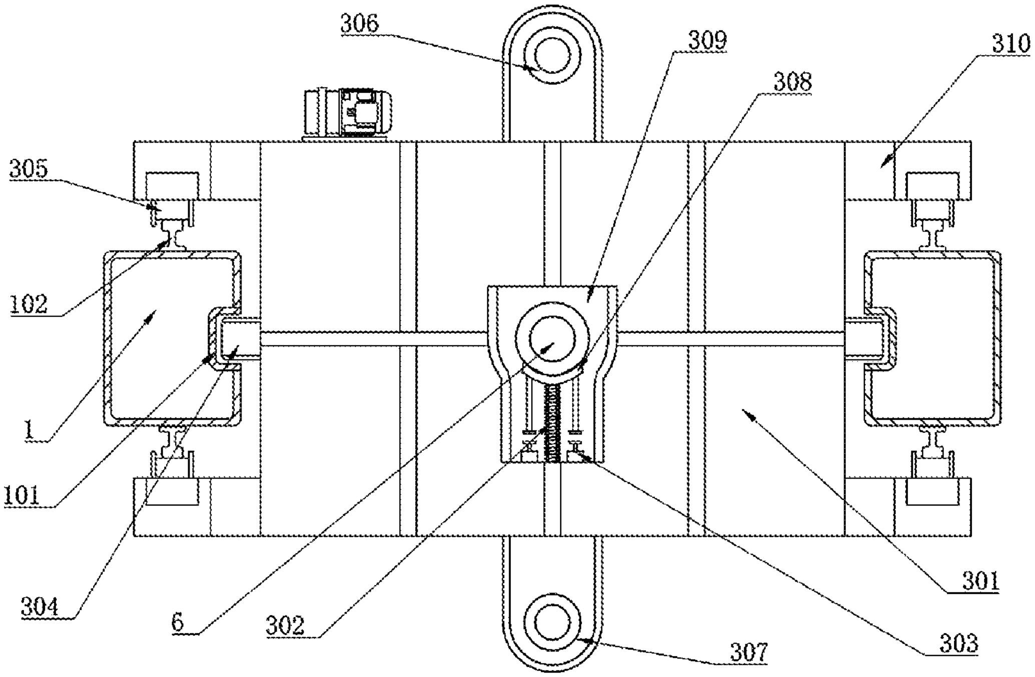
FIG. 3 is a sectional view of A-A in FIG. 1 when a suction solenoid valve is disconnected and a positioning pin extends out according to the present disclosure.
Figure 4:
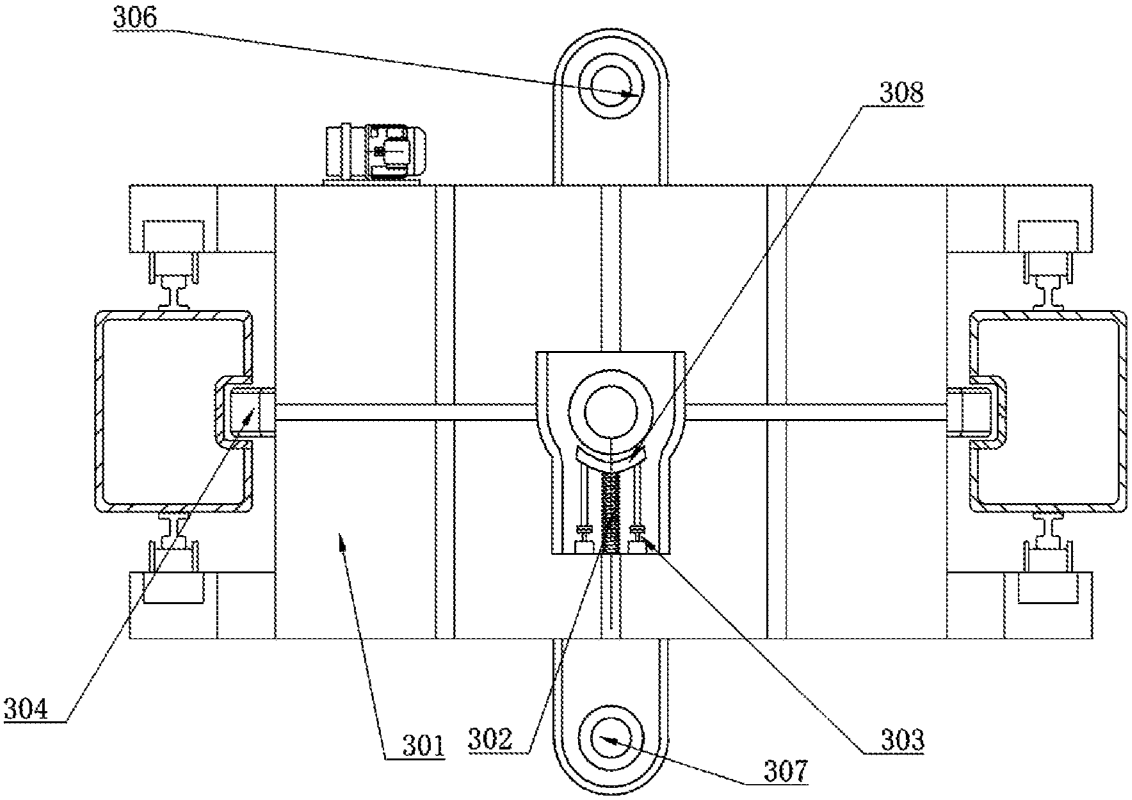
FIG. 4 is a sectional view of A-A in FIG. 1 when a suction solenoid valve is connected and a positioning pin extends out according to the present disclosure.
Figure 5:
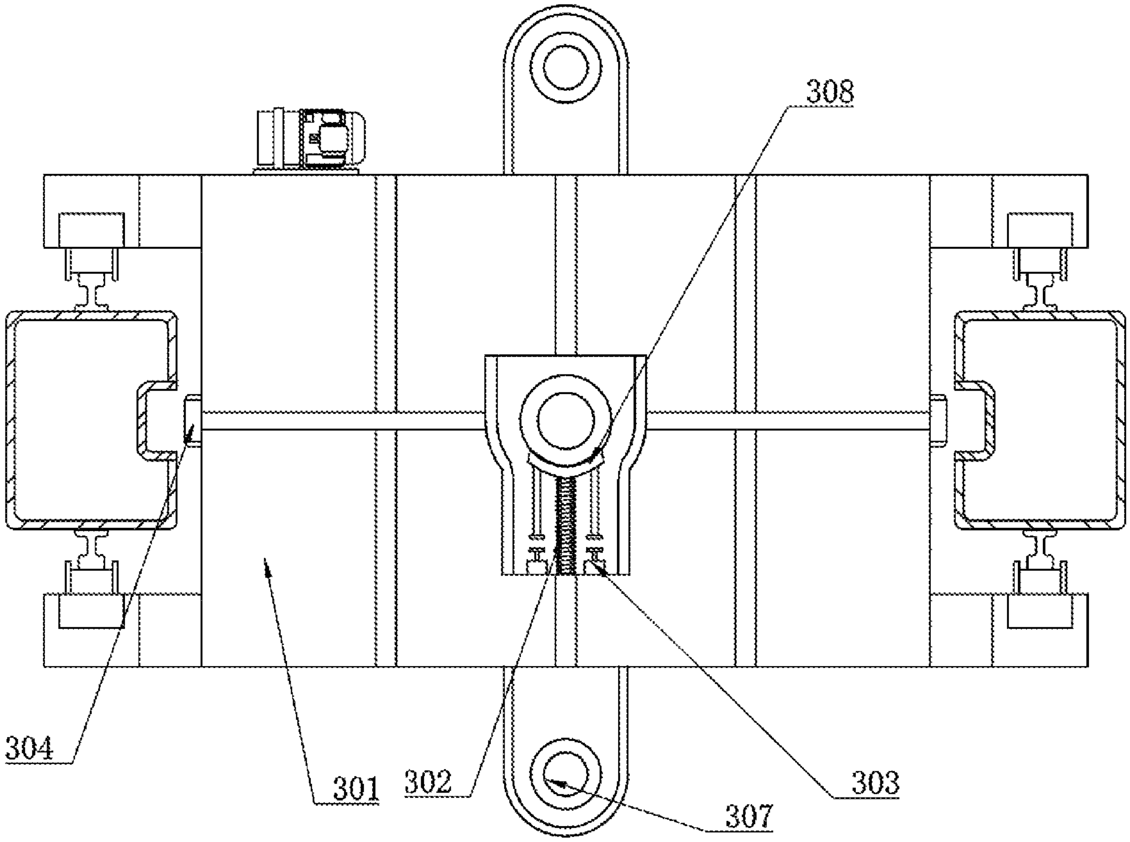
FIG. 5 is a sectional view of A-A in FIG. 1 when a suction solenoid valve is disconnected and a positioning pin is contracted according to the present disclosure.
Figure 6:
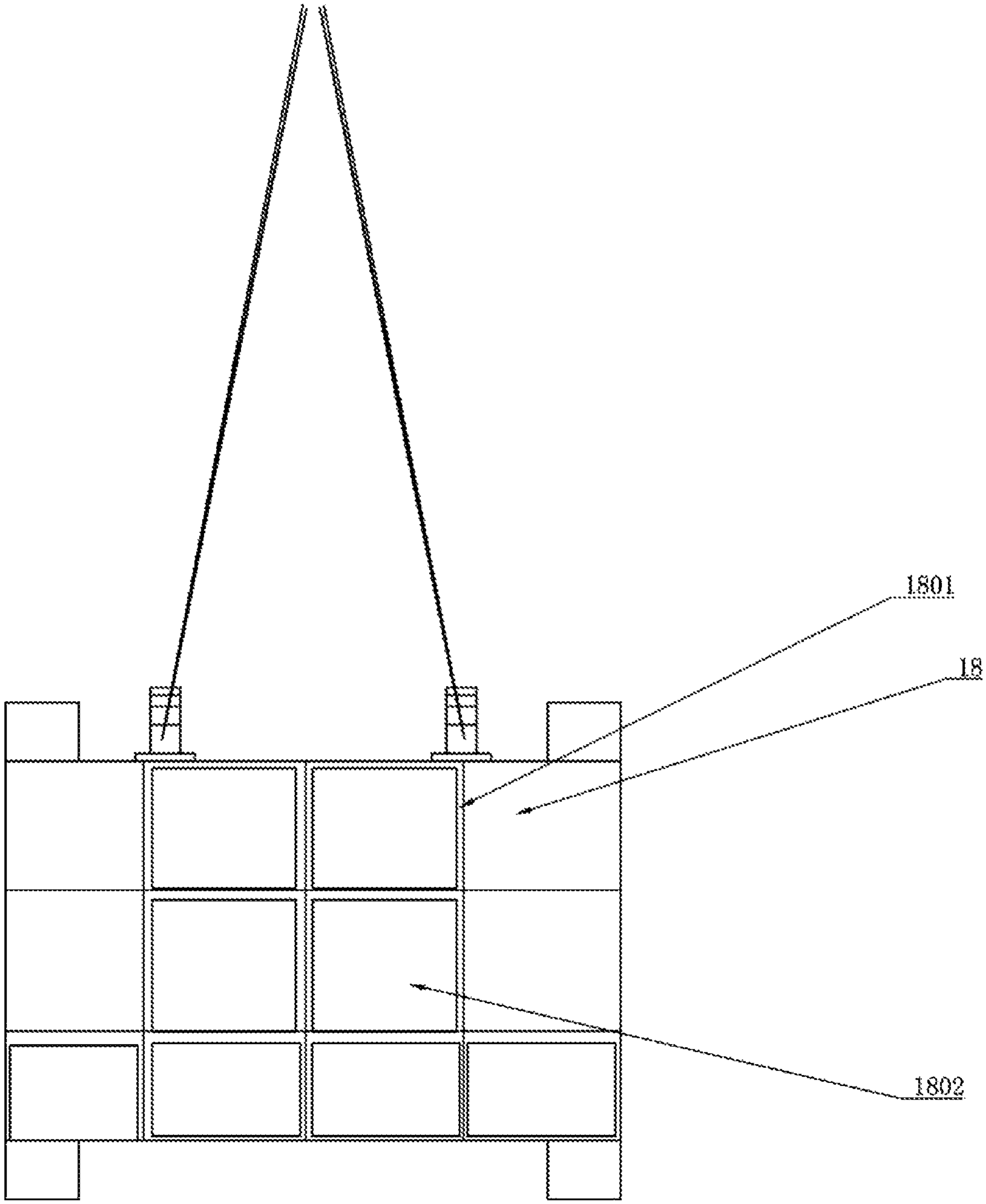
FIG. 6 is a front view of a counterweight box of the present disclosure.
Figure 7:
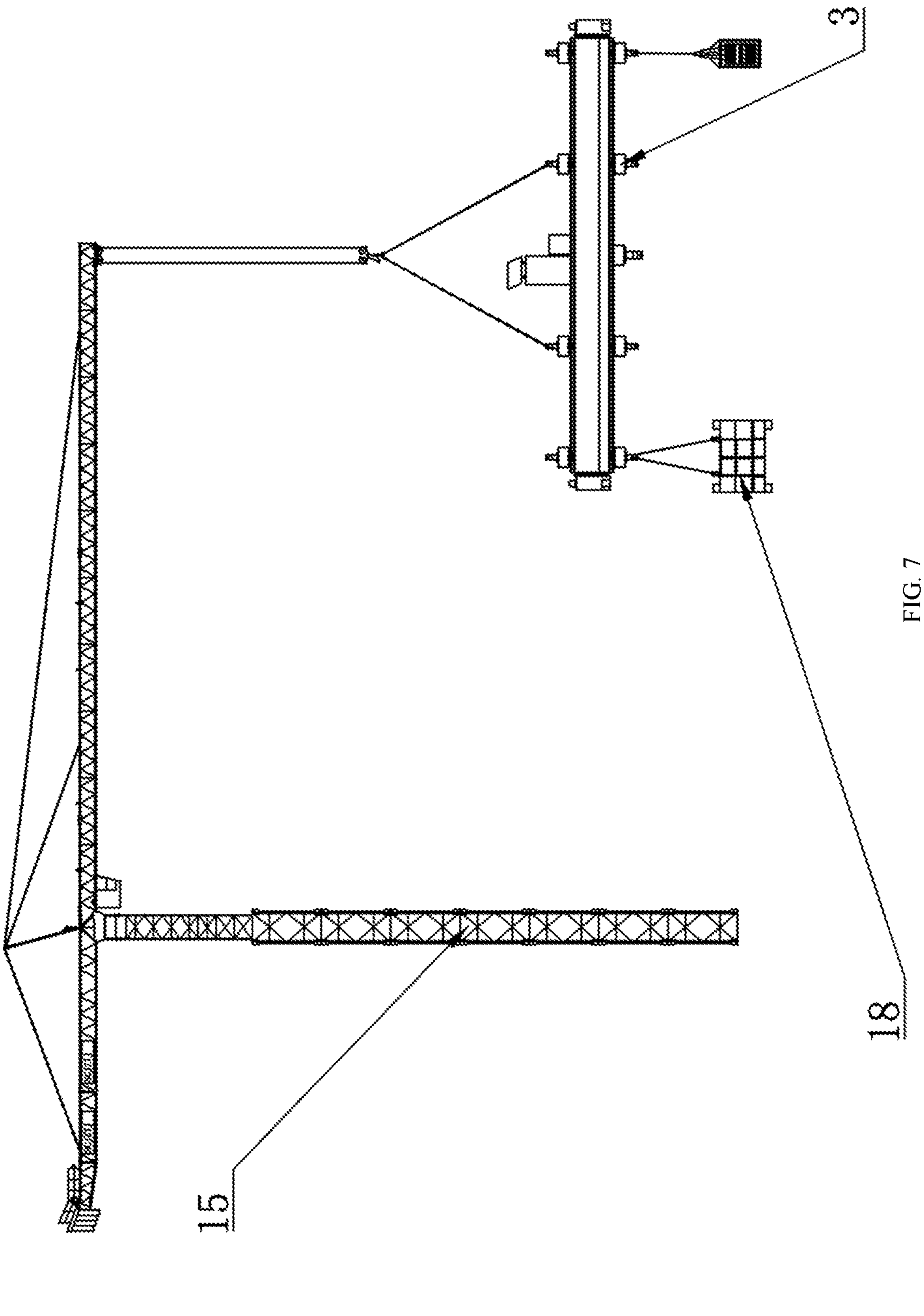
FIG. 7 is a schematic diagram of hanging with the amplitude extending outward when a crane is used according to the present disclosure.

As shown in FIGS. 1 to 7, a novel multi-purpose adjustable hanging beam comprises two parallel main beams 1, the two ends of each main beam 1 are respectively connected with end beams 2, a plurality of displacement hangers 3 sliding relative to the main beams 1 are arranged on the main beams 1, screw rods 6 are arranged between the two main beams 1, the displacement hangers 3 are in threaded connection with the screw rods 6, a first motor 7 is arranged at one end of each screw rod 6, reduction gearboxes 8 are arranged between the first motors 7 and the screw rods 6, one end of each screw rod 6 is connected with the corresponding reduction gearbox 8, and the first motors 7 and the reduction gearboxes 8 are mounted on the end beams 2. With the structure, the two ends of the two main beams 1 are connected with the two end beams 2, so that an integrally stable structure is formed; the main beams 1 and the end beams 2 are combined for use, and a light and stable structure such as a box girder or an I-beam can be adopted; and preferably, two parallel box girders are used as the main beams 1, and the two ends are connected by the box-type end beams to form the integrally stable structure. The displacement hangers 3 may be dynamically adjusted on the main beams 1, and the displacement hangers 3 can realize that a plurality of heavy objects or counterweight boxes with different weights may be hung below the hanging beam device. The hanging beam device may drive the displacement hangers to slide on the main beams on the basis of ensuring dynamic balance by acquiring information such as the position of the displacement hanger hung with the hanging hook of the crane, as well as the position of the displacement hanger hung with the heavy object or the counterweight box, and the hanging weight at any time through the automatic operation of a system control program, a moment arm of the heavy object or the counterweight box is adjusted, so that a moment balance is formed between the hung heavy objects or between the heavy objects and the counterweight box, so as to meet the requirements of dynamic luffing multi-machine lifting and hanging on various occasions, single-machine or multi-machine amplitude extension hanging, hanging in a hole on a shallow wall, single-machine aerial turning, matching or full-load hanging by using a plurality of cranes to adjust hanging points, simultaneous hoisting and unloading at different times of a plurality of hung objects, aerial dynamic adjustment of the hanging points of the cranes and the like which are difficult to be met by a hanging point fixing hanging beam.

The device can well meet the requirement of dynamic adjustment of the hanging point of the crane, and when the upper hanging point of the crane is adjusted, the displacement hanger 3, the heavy object at the lower part and the counterweight box are synchronously moved to keep overall dynamic balance, thereby avoiding the safety problem caused by the balance loss of the hanging beam device if the lower hanging point is not synchronously adjusted. Meanwhile, the hanging beam device has the advantages of simple structure, strong universality, automatic adjustment and the like.

In the preferable solution, bearing holes 101 are formed on the inner side of each main beam 1, each main beam 1 is provided with a beam track 102, a power supply control cabinet 12 is arranged on a cantilevered platform of one of the main beams 1 to avoid influencing the movement of the displacement hanger 3, the power supply control cabinet 12 is provided with a solar panel 13, and a storage battery 11 is arranged on one side of the power supply control cabinet 12. With this structure, the electric control device includes an external control device, and the power supply control cabinet 12, the solar panel 13, and the storage battery 11 that are arranged on the upper portions of the main beams 1. The external control device refers to a device arranged outside the main beams 1 and used for controlling various functions and actions of the main beams 1 through wireless and other means, including control software and hardware, a signal transceiver and a power supply device; the control device arranged on the main beams 1 is the power supply control cabinet 12, and the solar panel 13 and the storage battery 11 that supply power to the power supply control cabinet 12; the power supply control cabinet 12 is internally provided with power supply and control related software and hardware, a signal transceiver, a power supply conversion or transmission device, and a control device for converting solar energy into electric energy; and the solar panel 13 arranged on the power supply control cabinet 12 is used for acquiring the electric energy required by the hanging work, and the electric energy is stored in the storage battery 11 for use after conversion from solar energy into electric energy.

In the preferred solution, the displacement hangers 3 include hanger main bodies 301, through slots 309 are formed in the hanger main bodies 301, one or more suction solenoid valves 303 are arranged in each through slot 309, ends of the suction solenoid valves 303 are connected with silk tiles 308, the other ends of the suction solenoid valves 303 are mounted on the hanger main bodies 301, and the silk tiles 308 are in threaded connection with the screw rods 6. With the structure, the screw rods 6 control one or more sets of displacement hangers 3, the screw rods 6 are provided with spiral threads, and the silk tiles 308 are provided with radians and threads which are matched with the screw rods 6, so that the screw rods 6 and the silk tiles 308 may be effectively combined. The silk tiles 308 and a base are also provided with suction solenoid valves 303. The electric control device sends an instruction, and the suction solenoid valves 303 drive the silk tiles 308 to be separated from the screw rods 6 after suction, so that the displacement hangers 3 stop moving; or the first motors 7 stop rotating, and then the screw rod 6 stops rotating, so that the displacement hanger 3 stops moving. The first motors 7 are preferably variable frequency motors, so that the left and right screw rods 6 can move at different speeds, thereby driving the displacement hanger 3 to move at different speeds.

In the preferred solution, the return springs 302 are arranged between the silk tiles 308 and the hanger main bodies 301, upper hanging lugs 306 are arranged at the tops of the hanger main bodies 301, and lower lifting lugs 307 are arranged at the bottoms of the hanger main bodies 301. With this structure, the return springs 302 push the silk tiles 308 to be in contact with the screw rods 6 by the spring urging force, so that the displacement hangers 3 are moved by the rotating screw rods 6. The upper hanging lugs 306 arranged at the tops of the hanger main bodies 301 are connected with the hanging hook of the crane, and the lower hanging lugs 307 arranged at the bottoms of the hanger main bodies 301 may be connected with the balancing weight and the hanging weight through the steel wire rope or the remote control electric hoist as required.

In the preferable solution, telescopic positioning pins 304 are arranged on two sides of each hanger main body 301, pin penetrating motors 9 are arranged on the hanger main bodies 301, a pin penetrating oil pump 10 is arranged at one end of each pin penetrating motor 9, and the pin penetrating oil pumps 10 are connected with the positioning pins 304 through telescopic oil cylinders;

When the positioning pins 304 on the two sides of the hanger main body 301 extend out, the positioning pins 304 abut against the bearing holes 101. With the structure, after the displacement hangers 3 reach the working position, the electric control device sends a control instruction and sends an action instruction to the pin penetrating motors 9 and the pin penetrating oil pumps 10 to drive the positioning pins 304 to penetrate into the bearing hole 101 of the main beams 1, so as to avoid displacement during hanging.

In the preferred solution, a plurality of side plates 310 are arranged on two sides of each hanger main body 301, road wheels 305 hinged to the side plates 310 are arranged on the side plates 310, and slide against beam tracks 102, and a position sensor 4 and a weight sensor 14 are arranged on each hanger main body 301. With this structure, the displacement hangers 3 may be moved on the main beams 1 by the road wheels 305, and the displacement hangers 3 are provided with the position sensors 4 to confirm whether the displacement hangers have reached a predetermined position. The displacement hangers 3 are also provided with the weight sensors 14 to dynamically display the weights of the hung objects and transmit the weights to the electrical control device for dynamic and matching adjustment of the moment of the heavy object or the counterweight box 18.

In the preferable solution, one or more screw rods 6 are provided between the two main beams 1, a bearing seat 5 is arranged between the two main beams 1, and may be located at the centers or eccentric positions of the main beams as required, a bearing is arranged on the bearing seat 5, and the screw rods 6 are rotationally connected with the bearing seat 5. With the structure, according to the different use occasions, it is possible to use one or more screw rods 6 and the first motors 7 and the reduction gearboxes 8, one screw rod may only drive a plurality of displacement hangers 3 and hanging points at the same speed, or one or more of the displacement hangers are not driven. The two or more screw rods 6 are adopted to ensure that the two or more screw rods 6 may drive different displacement hangers 3 and hanging points at different speeds to synchronously move on the left and right sides of the main beams 1 in an equal moment proportion at matched speeds, thereby ensuring the moment balance on the left and right sides of the main beams 1. A bearing seat 5 is arranged at the middle positions or the non-middle positions of the main beams 1. The bearing seat 5 is internally provided with bearings matched with the screws rods 6 in quantity so as to support the rotation of the left and right screw rods 6. Preferably, the bearing seat 5 is arranged at the non-middle positions of the main beams 1. In order to move the displacement hangers 3 to the middle of the main beams 1 for hoisting and avoid the influence of the bearing seat 5 in the middle of the main beams 1 on the position of the displacement hangers 3 in the middle of the main beams 1, the middle of the hanging beam device is an important and frequently used hanging position.

Example 2

Figure 8:
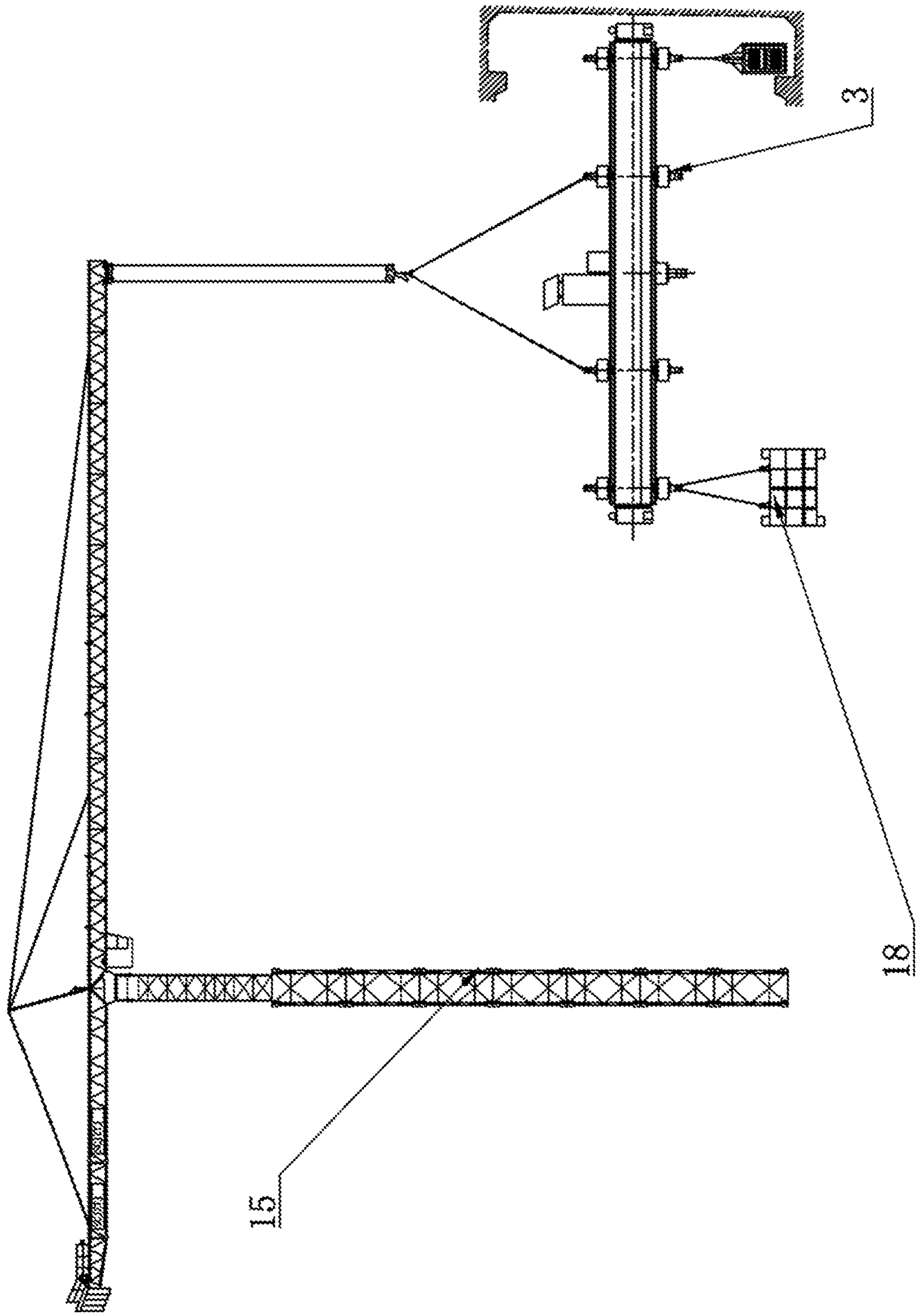
FIG. 8 is a schematic view of using a crane to extend into a hole for hanging according to the present disclosure.

For further description in combination with Embodiment 1, as shown in FIGS. 1 to 8, the working condition that the crane needs to extend outward for hanging is adopted to expand the working range of the crane. The situation that the amplitude of the existing crane does not meet the hanging requirements often occurs in the engineering field, and the hoisting amplitude can be partially extended according to the patent. The method is as follows: a hanging hook of the first crane 15 is placed in place in the air, and the first crane 15 is connected with two of the displacement hangers 3 on the hanging beam device; a counterweight box 18 or at least one heavy object is hung at the bottoms of at least two of the displacement hangers 3 on the hanging beam device, and a plurality of balancing weights 1802 are added into a balancing weight grid body 1801 of the counterweight box 18; when the first crane 15 is used for hoisting, the power supply control cabinet 12 is controlled to drive the displacement hanger 3 hung with the heavy object or the counterweight box 18 to move in an equal moment until the first crane 15 hangs the heavy object to an unloading position at a location requiring to be extended outward to unload the heavy object, the power supply control cabinet 12 is controlled synchronously and manually or automatically to adjust the overall structural posture to keep balance, and then after the first crane 15 is used for lowering, the counterweight box 18 and the hanging beam device are unloaded, thereby finishing the hanging. This method makes it possible to extend outwards for hanging beyond the length of the boom of the first crane 15.

According to the hanging mode of outward extension, the hanging of the shallow hole on the side wall, which is difficult to be realized by the original lifting equipment, may be realized in the same way, so that a simple, easy and safe idea and device are provided for solving the engineering problems.

Example 3

Figure 16:
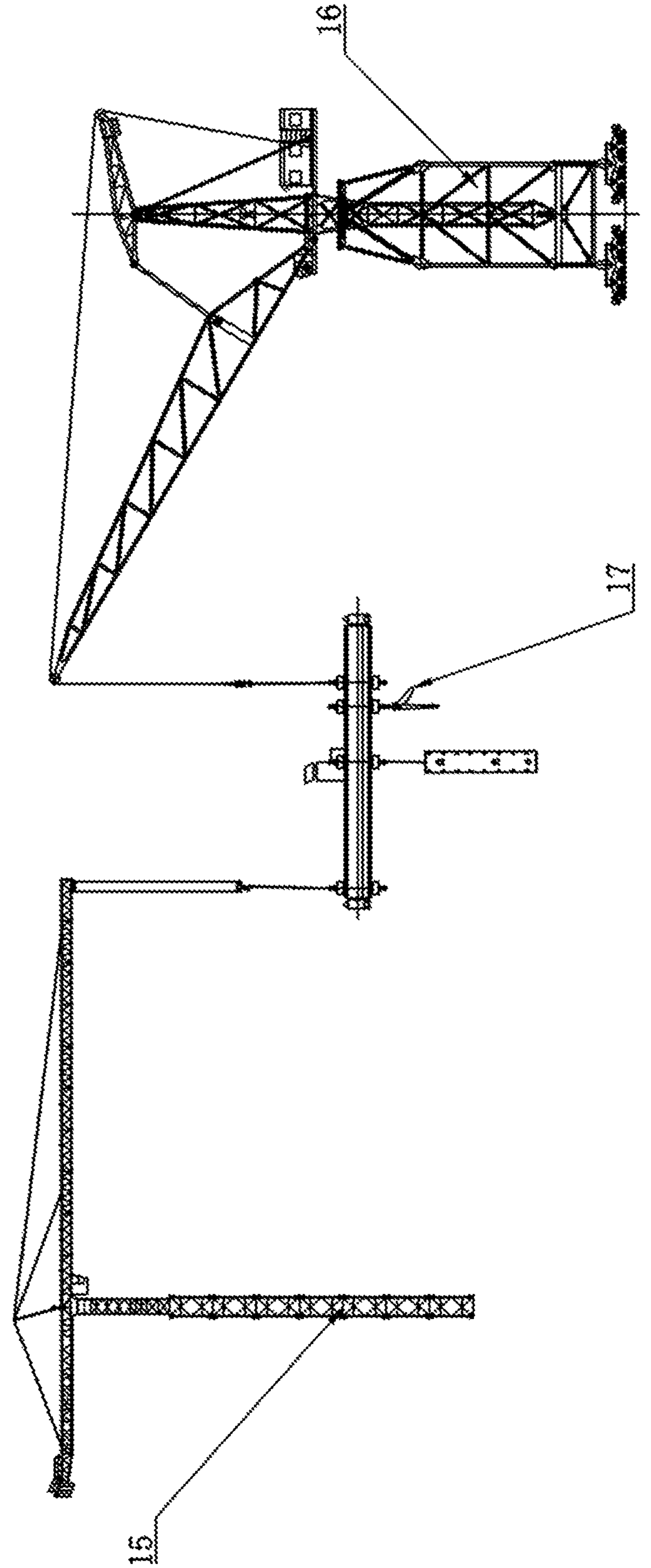
FIG. 16 is a schematic diagram of full-load hanging by using two cranes to adjust the hanging points according to the present disclosure.

For further description in combination with Embodiment 1, as shown in FIGS. 1 to 5 and FIG. 16, based on the condition that matching or full-load hanging is performed by using a plurality of cranes to adjust the hoisting points, the method is as follows: according to the weight of the hung heavy object and in combination with the amplitude required for lowering the heavy object lifted and hung by the first crane 15 and the second crane 16, the power supply control cabinet 12 is controlled manually or automatically to move the positions of the total three displacement hangers 3 connected with the first crane 15, the second crane 16 and the lifted and hung heavy object according to the principle of equal moment distribution, so as to achieve the effect of balancing the hanging loads of the first crane 15 and the second crane 16. The optimization effect of matching or full-load hanging of the first crane 15 and the second crane 16 of different models can even be realized. Therefore, the safety of lifting and hanging is improved, and the lifting capacity of the crane may be maximized Under the working condition of lifting and hanging by two or more cranes, because the hanging points of the hanging point fixing hanging beam may not be adjusted, the moment arm of the hanging points is unchanged, and the shared hanging weight of the cranes involved in lifting and hanging can not be adjusted, the situation that one crane is fully loaded and the hoisting capacity of other cranes is surplus and wasted is often caused, resulting in setting the limitation to the engineering hanging, and the project often needs to be equipped with cranes with greater lifting capacity, which causes a lot of unnecessary work and waste.

Example 4

Figure 9:
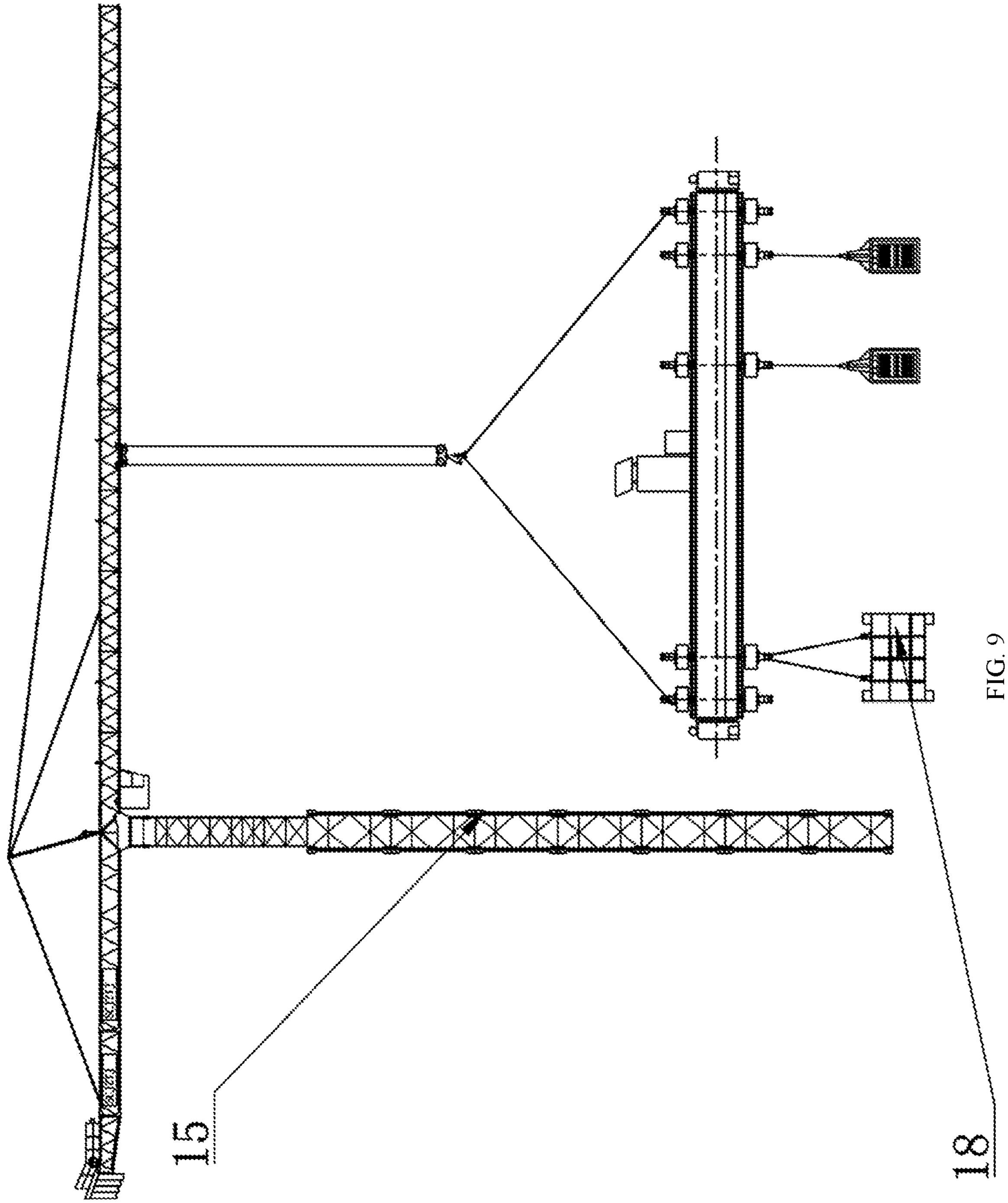
FIG. 9 is a first schematic diagram of simultaneously hoisting a plurality of hung objects by using a crane according to the present disclosure.
Figure 10:
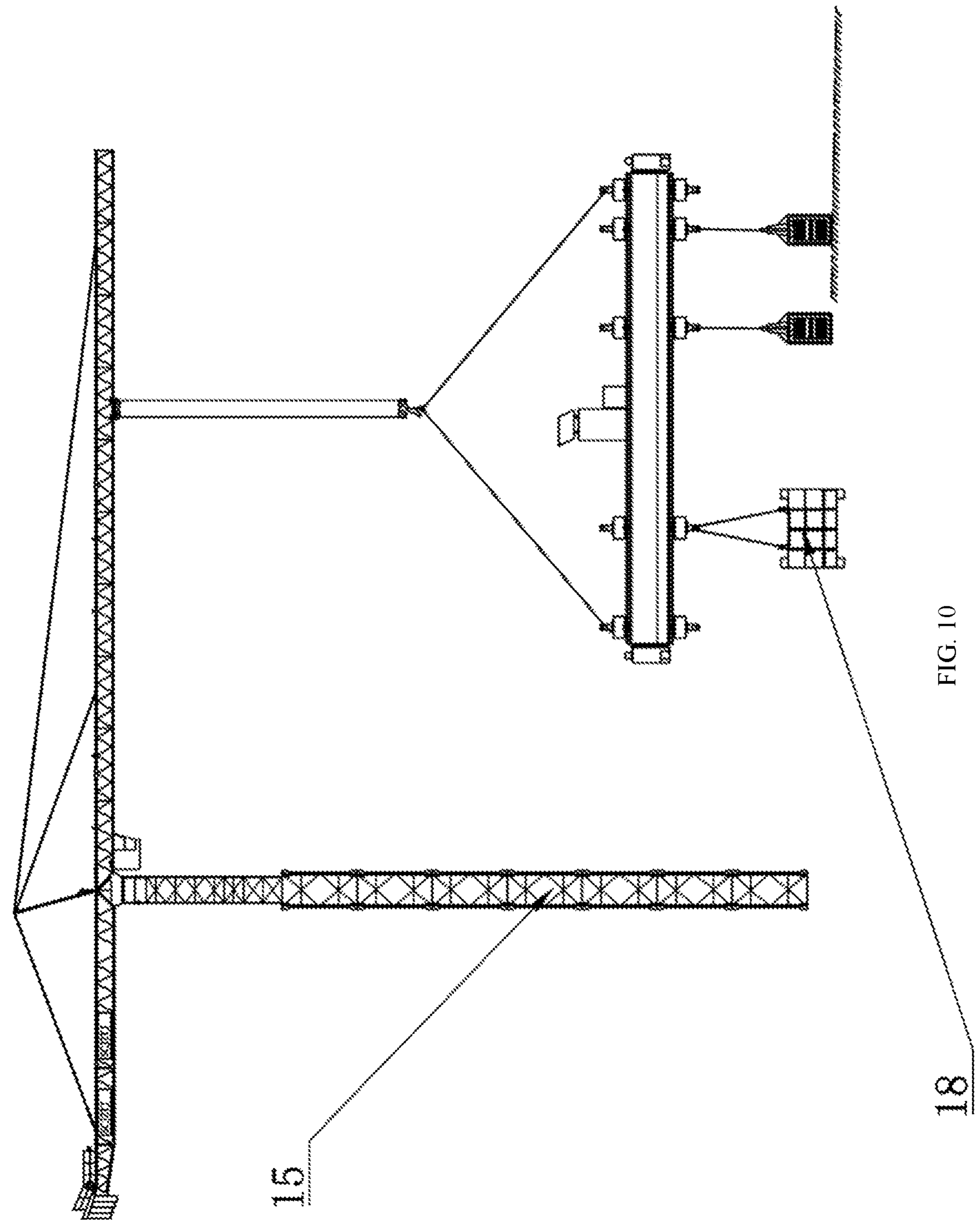
FIG. 10 is a second schematic diagram of simultaneously hoisting a plurality of hung objects by using a crane according to the present disclosure.
Figure 11:
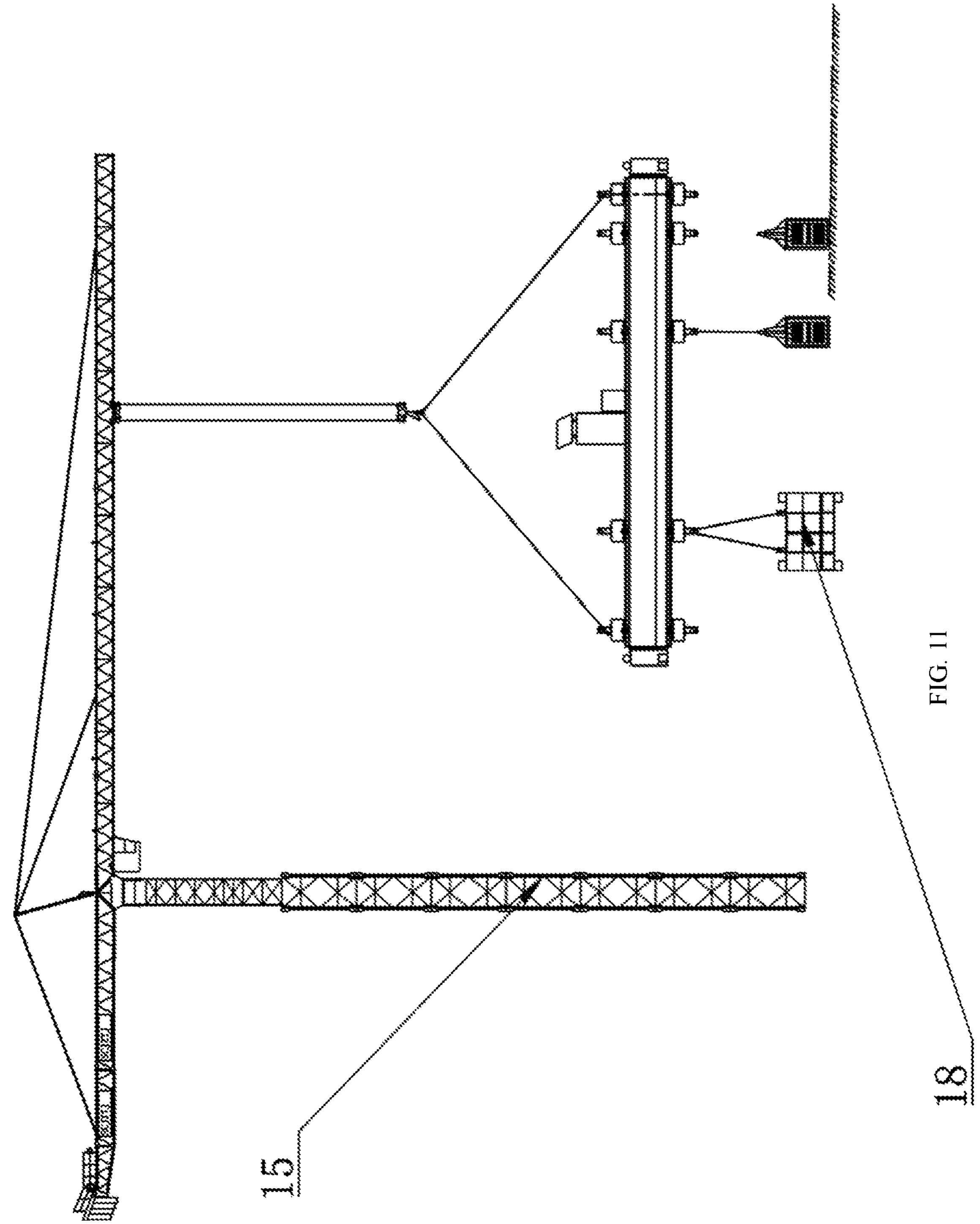
FIG. 11 is a third schematic diagram of simultaneously hoisting a plurality of hung objects by using a crane according to the present disclosure.
Figure 12:
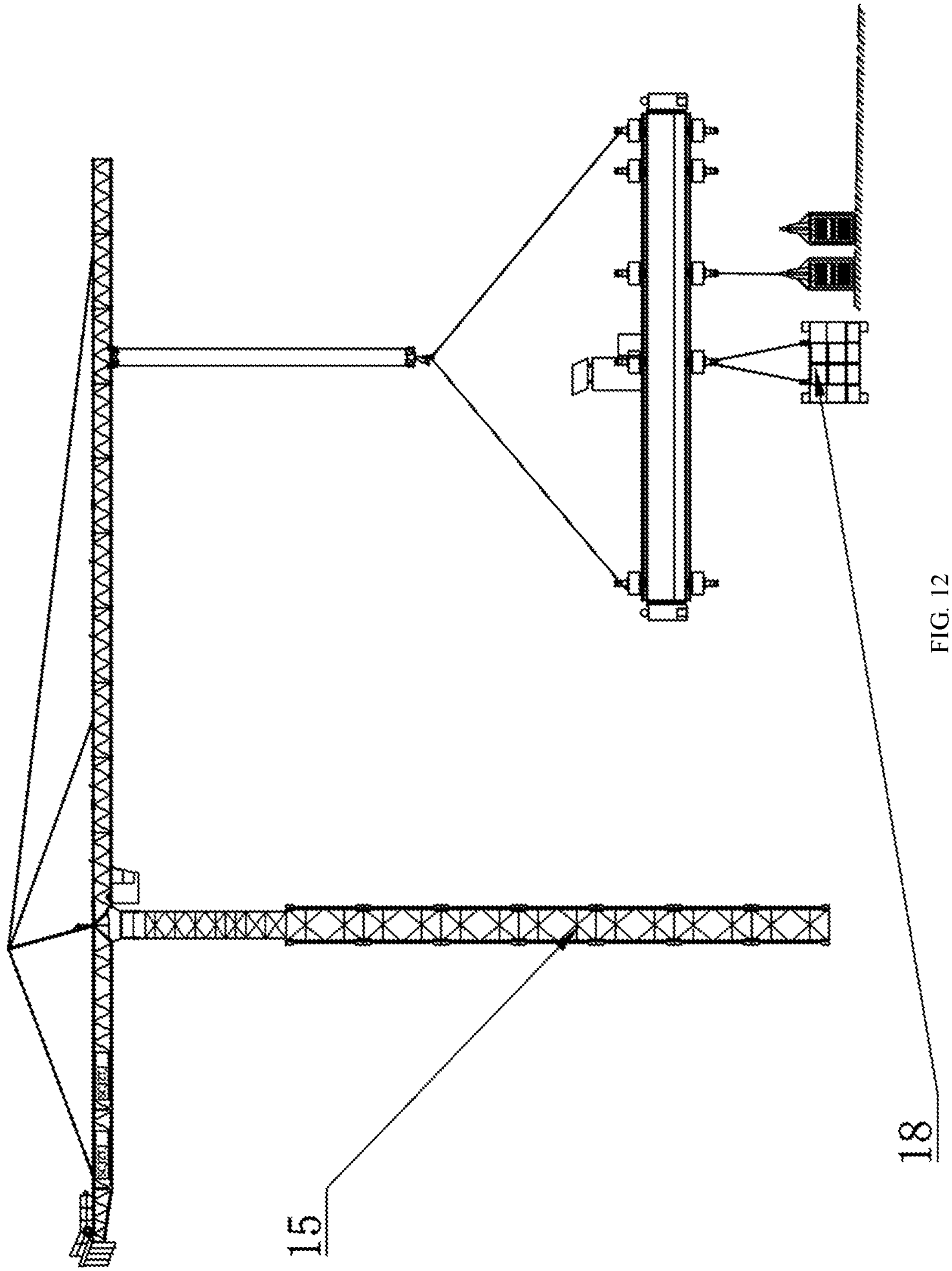
FIG. 12 is a fourth schematic diagram of simultaneously hoisting a plurality of hung objects by using a crane according to the present disclosure.

For further description in combination with Embodiment 1, as shown in FIGS. 1 to 6 and FIGS. 9 to 11, based on the condition that when a plurality of hung objects are hoisted simultaneously and unloaded at different times, the method is as follows: a hanging hook of the first crane 15 is placed in place in the air, and the first crane 15 is connected with two of the displacement hangers 3 on the hanging beam device; a counterweight box 18 or at least two heavy objects are hung at the bottoms of at least three of the displacement hangers 3 on the hanging beam device, and a plurality of balancing weights 1802 are added into a balancing weight grid body 1801 of the counterweight box 18 according to advanced calculation or automatic calculation of a program; when the first crane 15 is used for hoisting, the displacement hanger 3 hung with the heavy object or the counterweight box 18 moves on the main beams 1 through manual control or automatic control of a program of the power supply control cabinet 12, so that the displacement hanger 3 hung with the heavy object or the counterweight box 18 moves on the main beams 1, so as to adjust the posture of the overall structure in the air to keep dynamic balance; the first crane 15 moves the heavy object 1 to the unloading position to unload the heavy object 1, and the power supply control cabinet 12 is dynamically controlled in the process, so that the position of the counterweight box 18 is moved, and the overall structural posture is adjusted to keep dynamic balance; the step S4 is repeated until other heavy objects are unloaded in sequence; and after the first crane 15 is used for lowering, the counterweight box 18 is unloaded, thereby finishing the hanging.

Generally, only one object is hoisted in one hoisting cycle during a hanging operation. However, in some special cases, a plurality of objects need to be hoisted simultaneously and unhooked in place at different times, and the general hanging beam cannot keep dynamic balance in the partial unloading process, so that the function cannot be realized, but the patent can realize the lifting mode which seems to be complex but is very useful in special cases, thereby greatly improving the hanging efficiency. For example, it is necessary to minimize the occupation of the vehicle or site for transporting the hung object; and this is also the case that when the lifting equipment lifts the object, the load is reduced while walking, such as the case that when a mobile crane lifts a coil of cable, the cable is retracted and released while walking.

Example 5

Figure 13:
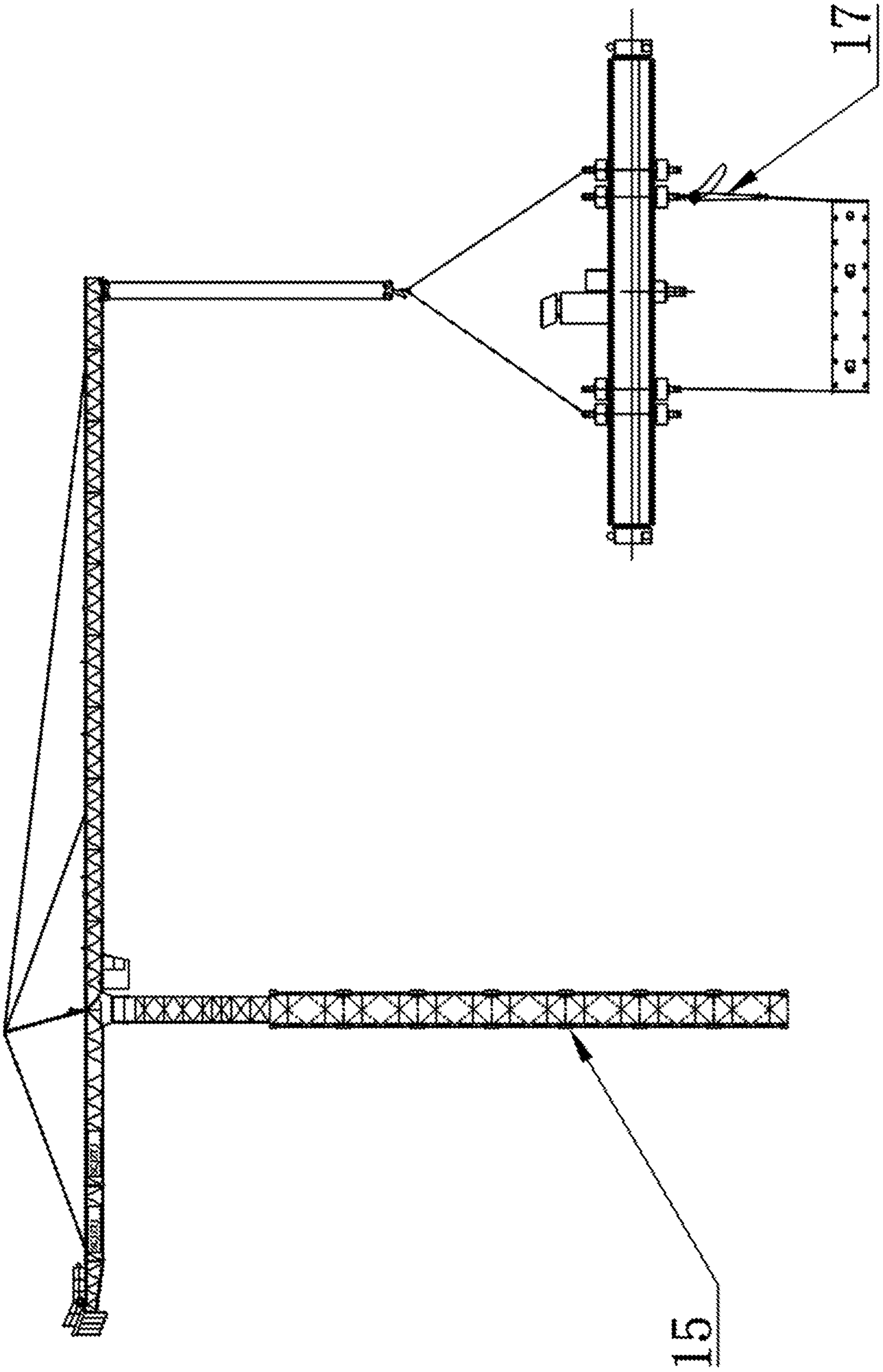
FIG. 13 is a first schematic diagram of turning over hung objects by using a crane according to the present disclosure.
Figure 14:
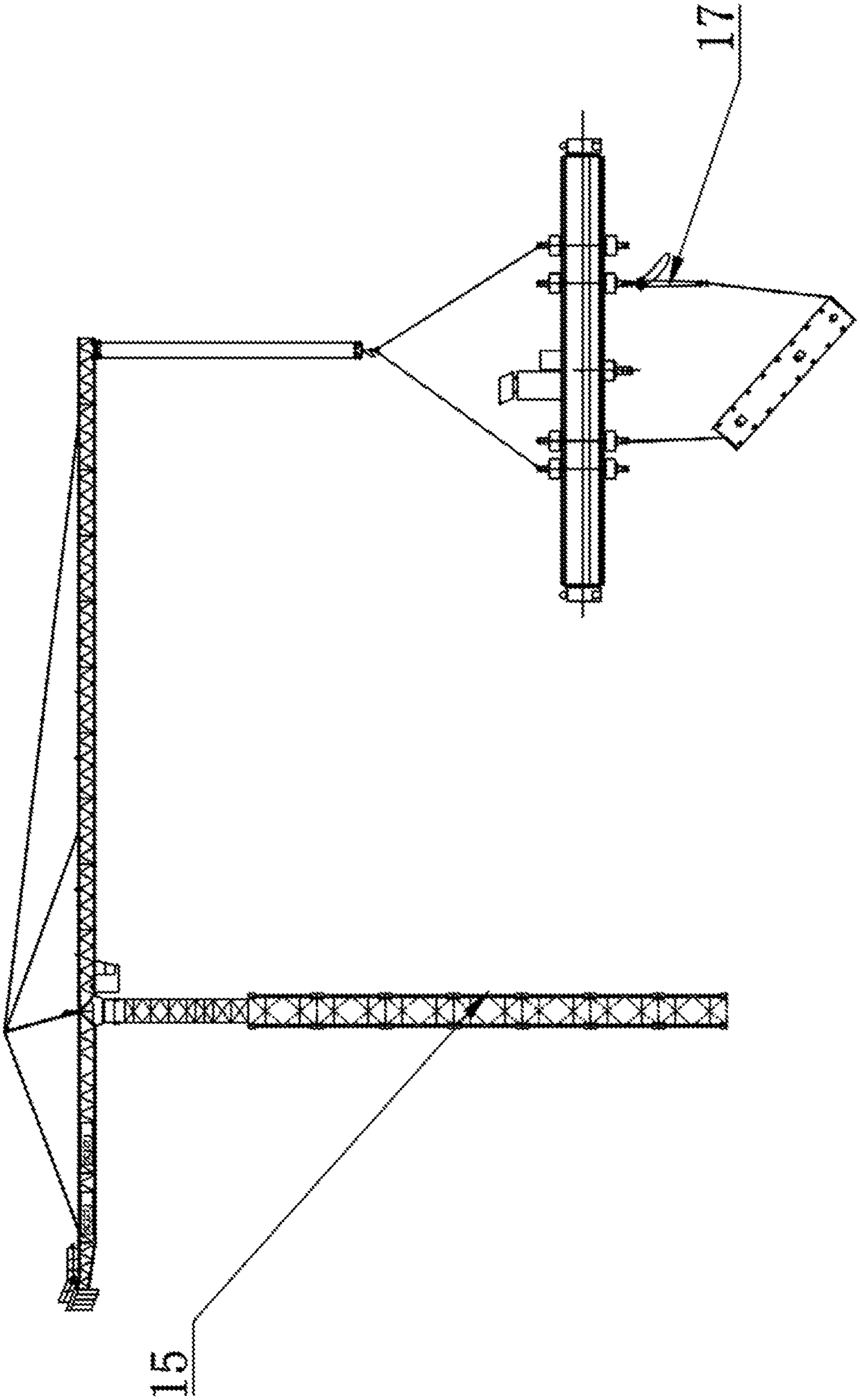
FIG. 14 is a second schematic diagram of turning over hung objects by using a crane according to the present disclosure.
Figure 15:
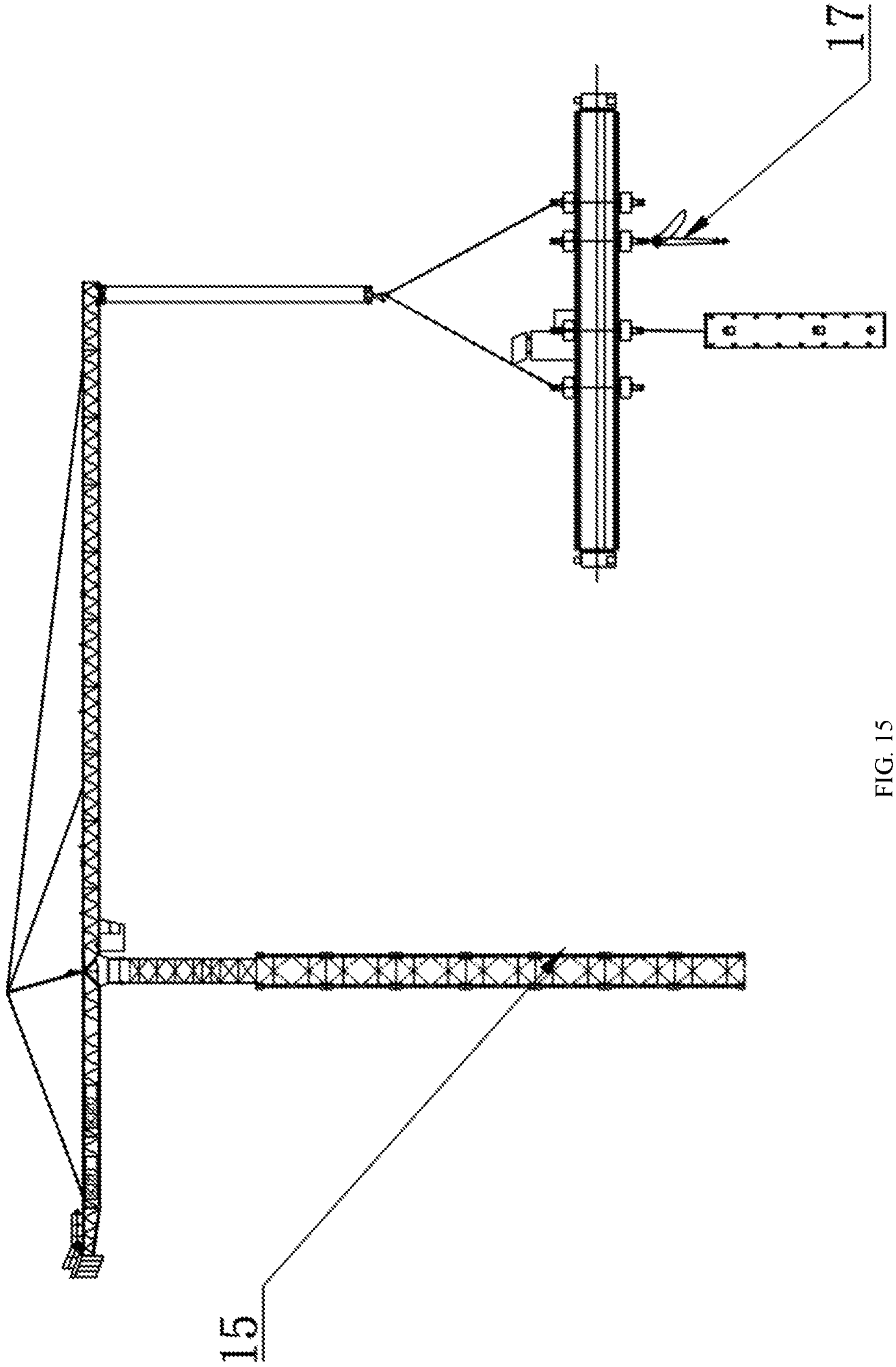
FIG. 15 is a third schematic diagram of turning over hung objects by using a crane according to the present disclosure.

For further description in combination with Embodiment 1, as shown in FIGS. 1 to 5 and FIGS. 13 to 15, one crane is used to turn over a heavy object in the air, if the hanging beam device of the patent is not used, at least two cranes need to be used to turn over the heavy object in the air. The method is as follows: the first crane 15 is connected to the upper hanging lugs 306 of the two displacement hangers 3; two ends of the heavy object to be turned over in a horizontal state are connected with the lower hanging lugs 307 of two other displacement hangers 3, and a remote control electric hoist 17 is mounted on a connecting hanging rope of one of the lower hanging lugs 307; when the first crane 15 is used for hoisting, the electric hoist 17 is remotely controlled in a wireless manner to release a chain block rope of the electric hoist 17, and meanwhile, the power supply control cabinet 12 is controlled, so that the displacement hanger 3 hung with the other end of the heavy object is moved to the displacement hanger 3 close to the end of the heavy object on the main beams 1, so as to adjust the heavy object slowly from the horizontal state to the vertical state in the air; and in the process of turning over, the gravity center of the heavy object should be kept on the original vertical line as far as possible, and the adjustment should be continued in the above way until the steel wire rope of the electric hoist 17 is in an unstressed state and the heavy object is in the vertical state, thereby finishing the turning over. After the first crane 15 is used for lowering, the heavy object is unloaded, thereby finishing the hanging.

Example 6

For further description in combination with Embodiment 1, as shown in FIGS. 1 to 5 and FIG. 16, the hanging point of the crane is dynamically adjusted in the air. In the processes of lifting and hanging by two cranes, if one crane needs to be in place, the safety problem of overload may occur when the crane amplitude is increased. Therefore, it is necessary to strictly control the amplitude when a plurality of cranes use hanging point fixing hanging beams to lift and hang heavy objects generally to avoid overload. The device and the method may well meet the requirement for dynamic adjustment of the hanging point of the crane. When the positions of the upper hanging lugs 306 of the displacement hanger 3 connected with the first crane 15 and the second crane 16 are adjusted or the amplitude is changed, the movement of the displacement hanger 3 and the heavy objects below is controlled manually or automatically through a program based on the advanced input parameter of a built-in control program of the power supply control cabinet 12, the hoisting performance of the first crane 15 and the second crane 16 for lifting and hanging, the weight of the heavy objects, the positions of the hanging points of the first crane 15 and the second crane 16 and amplitude change through the synchronous operation of the built-in control program and set parameters in the power supply control cabinet 12, so as to keep dynamic balance to avoid the safety problem due to balance loss of the hanging beam.

The above embodiment is only a preferred technical solution of the present disclosure, and should not be regarded as a limitation to the present disclosure. The protection scope of the present disclosure should be the technical solutions recorded in the claims, including the equivalent replacement solutions of the technical features in the technical solutions recorded in the claims. That is, equivalent replacement and improvement within this range are also within the protection scope of the present disclosure.

The invention claimed is:

1. A novel multi-purpose adjustable hanging beam, comprising: two parallel main beams (1), wherein the two ends of each main beam (1) are respectively connected with end beams (2), a plurality of displacement hangers (3) sliding relative to the main beams (1) are arranged on the main beams (1), screw rods (6) are arranged between the two main beams (1), the displacement hangers (3) are in threaded connection with the screw rods (6), a first motor (7) is arranged at one end of each screw rod (6), reduction gearboxes (8) are arranged between the first motors (7) and the screw rods (6), one end of each screw rod (6) is connected with the corresponding reduction gearbox (8), and the first motors (7) and the reduction gearboxes (8) are mounted on the end beams (2);

wherein a plurality of bearing holes (101) are formed on the inner side of each main beam (1), each main beam (1) is provided with a beam track (102), a power supply control cabinet (12) is arranged on a cantilevered platform of one main beam (1), and is provided with a solar panel (13), and a storage battery (11) is arranged on one side of the power supply control cabinet (12).

2. The novel multi-purpose adjustable hanging beam according to claim 1, wherein the displacement hangers (3) comprise hanger main bodies (301), through slots (309) are formed on the hanger main bodies (301), at least one suction solenoid valve (303) is arranged in each through slot (309), ends of the suction solenoid valves (303) are connected with silk tiles (308), the other ends of the suction solenoid valves (303) are mounted on the hanger main bodies (301), and the silk tiles (308) are in threaded connection with the screw rods (6).

3. The novel multi-purpose adjustable hanging beam according to claim 2, wherein return springs (302) are arranged between the silk tiles (308) and the hanger main bodies (301), upper hanging lugs (306) are arranged at the tops of the hanger main bodies (301), and lower hanging lugs (307) are arranged at the bottoms of the hanger main bodies (301).

4. The novel multi-purpose adjustable hanging beam according to claim 2, wherein telescopic positioning pins (304) are arranged on two sides of each hanger main body (301), pin penetrating motors (9) are arranged on the hanger main bodies (301), a pin penetrating oil pump (10) is arranged at one end of each pin penetrating motor (9), and the pin penetrating oil pumps (10) are connected with the positioning pins (304) through telescopic oil cylinders; and when the positioning pins (304) on the two sides of each hanger main body (301) extend out, the positioning pins (304) abut against the interiors of the bearing holes (101).

5. The novel multi-purpose adjustable hanging beam according to according to claim 2, wherein a plurality of side plates (310) are arranged on two sides of each hanger main body (301), road wheels (305) hinged to the side plates (310) are arranged on the side plates (310), and slide against beam tracks (102), and a position sensor (4) and a weight sensor (14) are arranged on each hanger main body (301).

6. The novel multi-purpose adjustable hanging beam according to according to claim 1, wherein at least one screw rod (6) is provided between the two main beams (1), a bearing seat (5) is arranged between the two main beams (1), and is located at the centers or eccentric positions of the main beams, a bearing is arranged on the bearing seat (5), and the screw rods (6) are rotationally connected with the bearing seat (5).

7. A hanging method of the novel multi-purpose adjustable hanging beam according to claim 1, comprises the following steps of: when a single first crane (15) is used: S1, placing a hanging hook of the first crane (15) in place in the air, and connecting the first crane (15) with two displacement hangers (3) on a hanging beam device;

S2, hanging a counterweight box (18) or at least one heavy object at the bottoms of at least two displacement hangers (3) on the hanging beam device, and adding a calculated appropriate amount of balancing weights (1802) into a balancing weight grid body (1801) of the counterweight box (18) through matching calculation or automatic calculation of a program;

S3, when the first crane (15) is used for hoisting, controlling a power supply control cabinet (12) manually or automatically through a system according to a program, so that the displacement hangers (3) hung with heavy objects and counterweight boxes (18) move on the main beams (1) in an equal moment, and the posture of the hanging beam device is adjusted in the air to keep dynamic balance;

S4, hanging the heavy objects to a target position by the first crane (15), unhooking after the heavy objects are in place, controlling the power supply control cabinet (12) at any time manually or through a system according to a program during the process, and adjusting the posture of the hanging beam device to keep dynamic balance;

S5, repeating step S4 until the heavy objects are completely unloaded; and

S6, after dropping from the hook of the first crane (15), unloading the counterweight boxes (18), thereby finishing hanging.

8. The hanging method of the novel multi-purpose adjustable hanging beam according to claim 7, comprises the following steps of: S1, placing the hanging hooks of the cranes in place in the air, and connecting one or more cranes with a plurality of displacement hangers (3) on a hanging beam device;

S2, hanging a counterweight box (18) or one or more heavy objects at the bottoms of the displacement hangers (3) on the hanging beam device, and adding a calculated appropriate amount of balancing weights (1802) into a balancing weight grid body (1801) of the counterweight box (18) through matching calculation or automatic calculation of a program;

S3, when the crane is used for hoisting, controlling the power supply control cabinet (12) manually or automatically through a system according to a program, so that the displacement hangers (3) hung with the hanging hook of the crane, the counterweight box (18) or the heavy object move on the main beams (1) in a moment matching manner, so as to dynamically adjust the relative positions of the hanging hook of the crane, the counterweight box or the heavy object on the hanging beam in the air to keep dynamic balance;

S4, hanging one hung heavy object to a target position by the crane, unhooking after the heavy object is in place, controlling the power supply control cabinet (12) manually or through a system according to a program during the process, and adjusting the posture of the hanging beam device to keep dynamic balance;

S5, repeating steps S3 and S4, and then hanging another heavy object to the target position and unhooking until the heavy objects are completely unloaded; and S6, after dropping from the hook of the cranes, unloading the counterweight boxes (18), thereby finishing the hanging.

9. The hanging method of the novel multi-purpose adjustable hanging beam according to claim 7, comprising the following steps of: S1, placing the hanging hooks of one or more cranes in place in the air, and connecting the cranes with upper hanging lugs (306) on the displacement hangers (3);

S2, connecting the two ends of a hung object with lower hanging lugs (307) of the two displacement hangers (3) through a steel wire rope, and mounting a remote control electric hoist (17) on a hanging rope for connecting one end of the hung object and the lower hanging lugs (307) of the displacement hangers (3);

S3, controlling the power supply control cabinet (12) manually or automatically through a system according to a program, so that the displacement hangers (3) hung with the heavy objects move on the main beams (1), and the gravity centers of the heavy objects are kept on a vertical line position calculated and set on the hanging beam device to keep dynamic balance, and meanwhile, remotely controlling the electric hoist (17) to extend or contract the steel wire rope in a wireless manner until the steel wire rope of the electric hoist (17) is in an unstressed state and the heavy object is in a vertical state, thereby finishing the turning over; and S4, after moving the first crane (15) and a second crane (16) to the hook dropping position, unloading the heavy objects, thereby finishing the banging.

10. The method of claim 7, wherein a plurality of bearing holes (101) are formed on the inner side of each main beam (1), each main beam (1) is provided with a beam track (102), a power supply control cabinet (12) is arranged on a cantilevered platform of one main beam (1), and is provided with a solar panel (13), and a storage battery (11) is arranged on one side of the power supply control cabinet (12).

11. The method of claim 7, wherein the displacement hangers (3) comprise hanger main bodies (301), through slots (309) are formed on the hanger main bodies (301), at least one suction solenoid valve (303) is arranged in each through slot (309), ends of the suction solenoid valves (303) are connected with silk tiles (308), the other ends of the suction solenoid valves (303) are mounted on the hanger main bodies (301), and the silk tiles (308) are in threaded connection with the screw rods (6).

12. The method of claim 11, wherein return springs (302) are arranged between the silk tiles (308) and the hanger main bodies (301), upper hanging lugs (306) are arranged at the tops of the hanger main bodies (301), and lower hanging lugs (307) are arranged at the bottoms of the hanger main bodies (301).

13. The method of claim 11, wherein telescopic positioning pins (304) are arranged on two sides of each hanger main body (301), pin penetrating motors (9) are arranged on the hanger main bodies (301), a pin penetrating oil pump (10) is arranged at one end of each pin penetrating motor (9), and the pin penetrating oil pumps (10) are connected with the positioning pins (304) through telescopic oil cylinders; and when the positioning pins (304) on the two sides of each hanger main body (301) extend out, the positioning pins (304) abut against the interiors of the bearing holes (101).

14. The method of claim 11, wherein a plurality of side plates (310) are arranged on two sides of each hanger main body (301), road wheels (305) hinged to the side plates (310) are arranged on the side plates (310), and slide against beam tracks (102), and a position sensor (4) and a weight sensor (14) are arranged on each hanger main body (301).

15. The method of claim 7, wherein at least one screw rod (6) is provided between the two main beams (1), a bearing seat (5) is arranged between the two main beams (1), and is located at the centers or eccentric positions of the main beams, a bearing is arranged on the bearing seat (5), and the screw rods (6) are rotationally connected with the bearing seat (5).

* * * * *